United States Patent

McLean

[15] 3,699,546

[45] Oct. 17, 1972

[54] FLEXIBLE CABLE MEMORY ASSEMBLY

[72] Inventor: William E. McLean, Hales Corners, Wis.

[73] Assignee: General Motors Corporation, Detroit, Mich.

[22] Filed: Nov. 27, 1970

[21] Appl. No.: 93,139

[52] U.S. Cl. ..340/174 M, 340/174 AC, 340/174 JA, 340/174 WA, 340/174 MA

[51] Int. Cl. ..........................G11c 5/04, G11c 11/06

[58] Field of Search....................340/174 M, 174 AC

[56] References Cited

UNITED STATES PATENTS

| | | | |
|---|---|---|---|
| 3,432,827 | 3/1969 | Sarno | 340/174 M |
| 3,564,517 | 2/1971 | McLean et al. | 340/174 M |
| 3,201,767 | 8/1965 | Bradley | 340/174 M |
| 3,218,615 | 11/1965 | Reimer et al. | 340/174 M |

*Primary Examiner*—James W. Moffitt
*Attorney*—E. W. Christen, C. R. Meland and Albert F. Duke

[57] ABSTRACT

A flexible cable having top and bottom surfaces and top and bottom conductive layers embedded therebetween has affixed to the top surface thereof a plurality of core arrays having continuous drive conductors and separate sense and inhibit lines threaded therethrough to comprise sets of memory mats in a coincident current digital computer. Also affixed to the top surface of the cable and in the vicinity of different memory sets are respective electronic processing units which are terminated to the ends of the sense and inhibit lines threaded through the different mats. A memory conductor unique to each mat and comprised of paths in the top and bottom conductive layers and conductive through-holes therebetween communicates from an edge of the cable to the electronic units of each respective memory set. These memory conductors carry inhibit control signals to the respective electronic units during writing operations and sense signals from the electronic units during reading operations. Affixed to the bottom surface of the cable under each set of mats is a support plate, the bottom surface of which is mateable in heat transfer and supporting relationship with the bottom surface of an adjacent plate when the cable and plates are folded in an accordion-like manner. The edges of the alternate plates are then affixed in heat transfer and supporting relationship to encompassing structures.

7 Claims, 9 Drawing Figures

INVENTOR.
William E. McLean

BY albert F. Duke
ATTORNEY

INVENTOR.
William E. McLean

BY
Albert F. Duke
ATTORNEY

INVENTOR.
William E. McLean

BY
Albert F. Duke
ATTORNEY

FLEXIBLE CABLE MEMORY ASSEMBLY

This invention relates to a memory assembly for a coincident current digital computer, the memory mats of which are affixed to the top surface of a flexible cable having conductive layers comprising circuit paths embedded therein and the bottom surface of which is connected to plates foldable therewith and secured to support structures.

As shown in my copending application Ser. No. 739,251, filed June 24, 1968 and now U.S. Pat. No. 3,564,517, entitled "Combined DRO and NDRO Coincident Current Memory," and assigned to the assignee of the present invention, the memory of a coincident current digital computer is comprised of a plurality of core arrays, each such array representing a different bit of the computer word and the cores of an array aligned in rows and columns. The corresponding rows and columns in each array are threaded by continuous row and column drive conductors. Each array is also threaded with a separate sense line and usually with a separate inhibit line. The arrays so threaded are called memory mats which are then folded over support boards and affixed thereto to comprise a memory stack.

The ends of the continuous row and column drive conductors are terminated to steering diodes and selection electronics that are located on structures remote from the stack. Therefore, these terminations need not be disconnected to open or unfold the stack. However, such is not the case with the sense and inhibit lines which are also terminated to usually remote electronic units, especially where the word capacity and bit length of the computer are too large and long to allow the associated electronic units to be mounted on the same board with all the memory mats. A separate lead must be made either from the sense and inhibit lines of each mat to the respective electronic processing units mounted remotely from the mat or from the electronic units mounted in proximity to the mats to an external data register into which the sensed data is read or from which the inhibit commands are generated. However, to avoid reading and writing errors due to noise on the sense and inhibit line, such sense and inhibit leads should not traverse from a give mat to the remotely located electronic units by extending the length of the unfolded adjacent mats. Instead, the required sense and inhibit leads are brought out of the sides of the stack after the completely strung arrays are first folded over the supporting plates and are then terminated, usually by soldering, to the associated electronic units.

However, while memories may be tested on a mat-by-mat level before being so folded and terminated, many characteristics of the mat and memory operation can be tested and diagnosed only when the entire memory is tested and such testing requires that the stack be folded and all the sense and inhibit leads be terminated to their associated electronic units. To repair faults subsequently discovered in the cores, drive lines, sense or inhibit lines, or associated electronic units during such system tests therefore requires that the sense and inhibit leads be disconnected or unsoldered from their associated electronic units so that the stack may be unfolded and opened.

Each such opening of the memory on the detection of a fault and subsequent closing of the memory after its repair requires substantial expenditure. Moreover, the frequency of such unsoldering and unfolding increases with increasing word capacity and bit length as well as increasing compactness. For example, the 4,096-13 bit word memory of the above-referenced application is opened once 80 percent of the time, twice 50 percent of the time, and more than twice 20 percent of the time. Such opening and closing also introduces a mode of failure associated entirely with the manufacture of the memory. This mode arises from the flexing and stressing of the drive conductors threaded continuously through all the mats and also from incorrectly made connections upon closing of the memory after an initial fault has been repaired. The resulting subsequent faults also require substantial expenditure to first diagnose and then to repair. It is, therefore, desirable that the memory stack be designed to avoid disconnection and subsequent reconnection of the sense and inhibit leads upon opening and closing the memory, thereby eliminating the time and failure mode associated with such connections. It is also desirable that the memory be designed to minimize the flexing and stressing of the drive conductors during such repair.

It is, therefore, a primary object of the present invention to provide a memory assembly adapted to be operated in a coincident current mode and comprising mats of core arrays each threaded by continuous row and column conductors and also by a separate sense line where such mats are affixed to a flexible cable having for each mat a separate conductive path therein comprising a sense lead connected in circuit with the sense line of each mat so that the cable may be folded and unfolded without requiring separate connection and disconnection of the sense line.

It is another object of the present invention to provide a memory assembly of the foregoing type wherein the electronic units for sensing and amplifying the information read out from a particular mat are mounted in proximity thereto on the flexible cable and wherein the cable also has conductive paths therein connecting the electronic units to power, ground, reference, and logic busses.

It is a further object of the present invention to provide a memory assembly of the foregoing type wherein each mat may be tested with its associated electronic units while the memory is unfolded and while using the same conductors as are used when the memory is folded.

It is a further object of the present invention to provide a memory assembly of the foregoing type wherein the electronic units associated with the writing operations of each mat are located in proximity thereto on the flexible conductor and are connected in circuit with the sense lead therein so that the sense and inhibit electronic units associated with a given mat share at least one conductive path in the flexible cable unique to that mat.

It is a further object of the present invention to provide a memory assembly of the foregoing type wherein the memory mats may be readily folded and unfolded without stretching the continuous conductors threaded through the arrays and without exposing the assembly to possible deleterious effects otherwise associated with disconnecting and reconnecting the sense and inhibit conductors.

It is a further and more specific object of the present invention to provide a memory assembly of the foregoing type where the flexible cable is secured to sets of frames, each frame located under a set of mats and where, upon folding the flexible cable, one frame of a set is positioned in supporting and heat transfer relationship with respect to the other frame of the set and wherein the edges of one of the frames are secured to supporting structures.

The present invention accomplishes these and other objectives by affixing memory mats fully threaded with continuous row and column drive conductors and with sense and inhibit lines to the top surface of a flexible cable having two layers of conductive paths embedded therein. Affixed to the bottom surface of the cable under sets of mats are plates that are foldable with the cable and securable to external supporting structure to comprise a compact memory assembly. Electronic units for processing information detected from associated mats during the reading operation and for commanding the inhibiting of those mats during writing operations are mounted on the top surface of the cable in proximity to their respective mats and are electrically connected to conductive paths in the first and second layers communicating with the edges of the cable. One such conductive path is unique to each different mat to communicate information detected during reading operations thereof and to command inhibiting thereof during writing operations. The other conductive paths contained in the cable are common to all the mats and carry the requisite ground, power supply, and read and write logic busses necessary to operate the electronic units associated with each different set of mats.

These and other details and objects of the present invention will become apparent from the attached description and drawings wherein.

Figures 5, 7A:
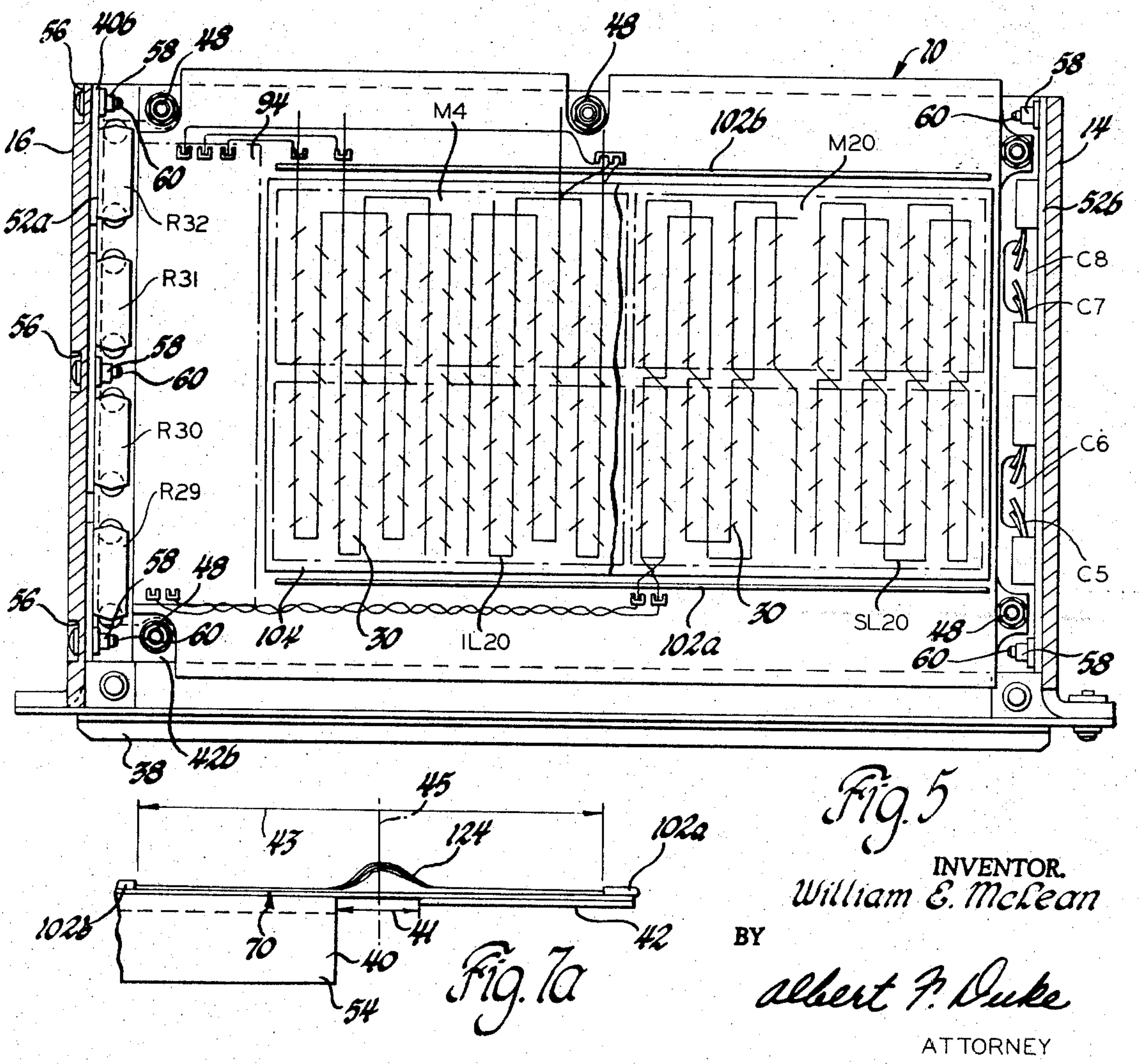
FIG. 5 is a longitudinal section of the memory assembly of FIG. 1 along view 5—5 thereof showing a set of memory mats and their associated electronic units and also the configuration of a sense line through one of the mats and the configuration of an inhibit line through the other.
Figures 7, 8:
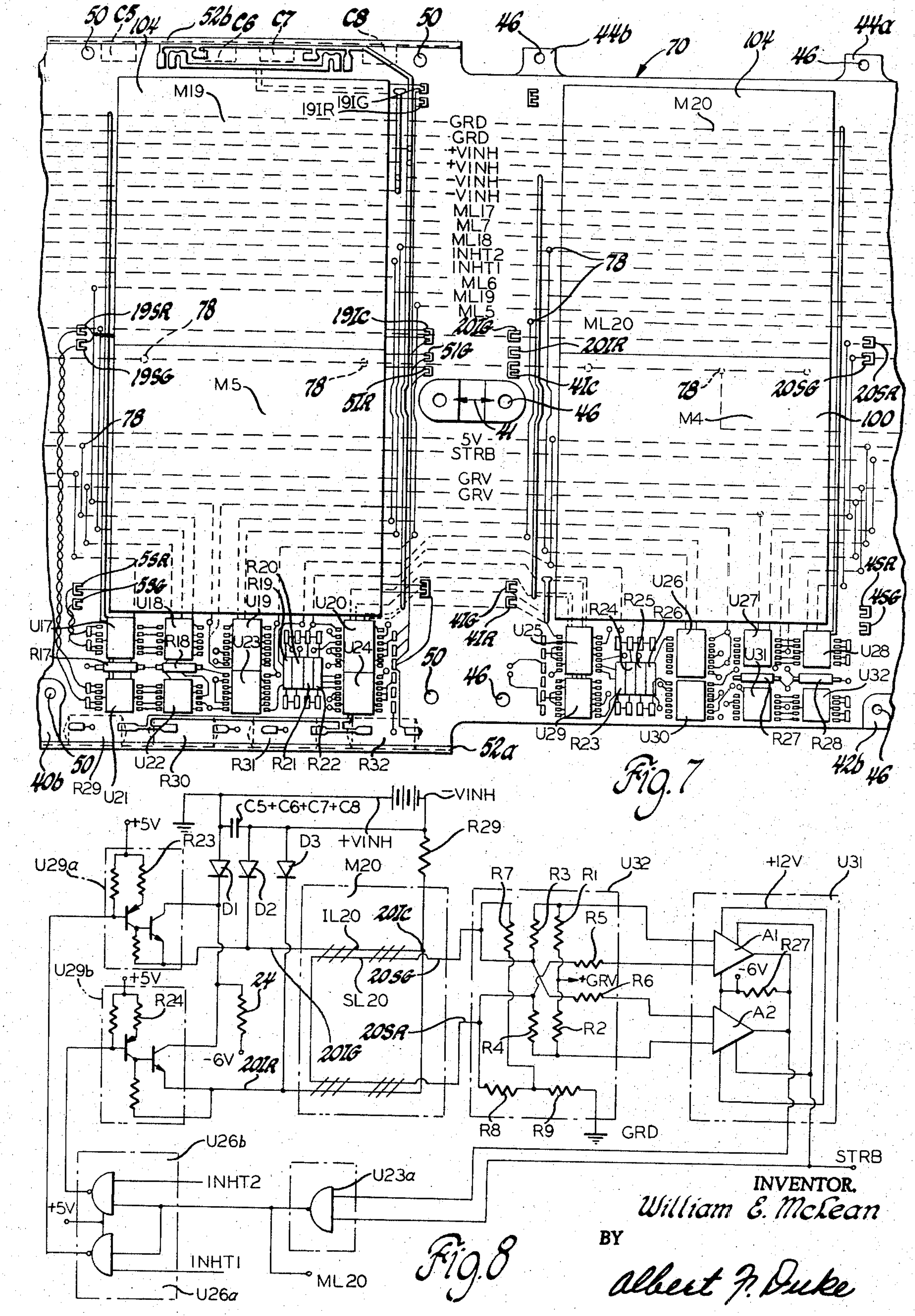

FIGS. 7 and 7*a* are plan and side views of an unfolded portion of the assembly showing in greater detail the requisite mat and plate spacing as well as the electronic units and the connections thereof with lines from memory mats and conductive paths in the cable; and FIG. 8 is a representative electrical schematic of a circuit utilizing the units and conductive paths shown in FIG. 7 for reading and writing operations.

Figures 1, 2, 3, 4:
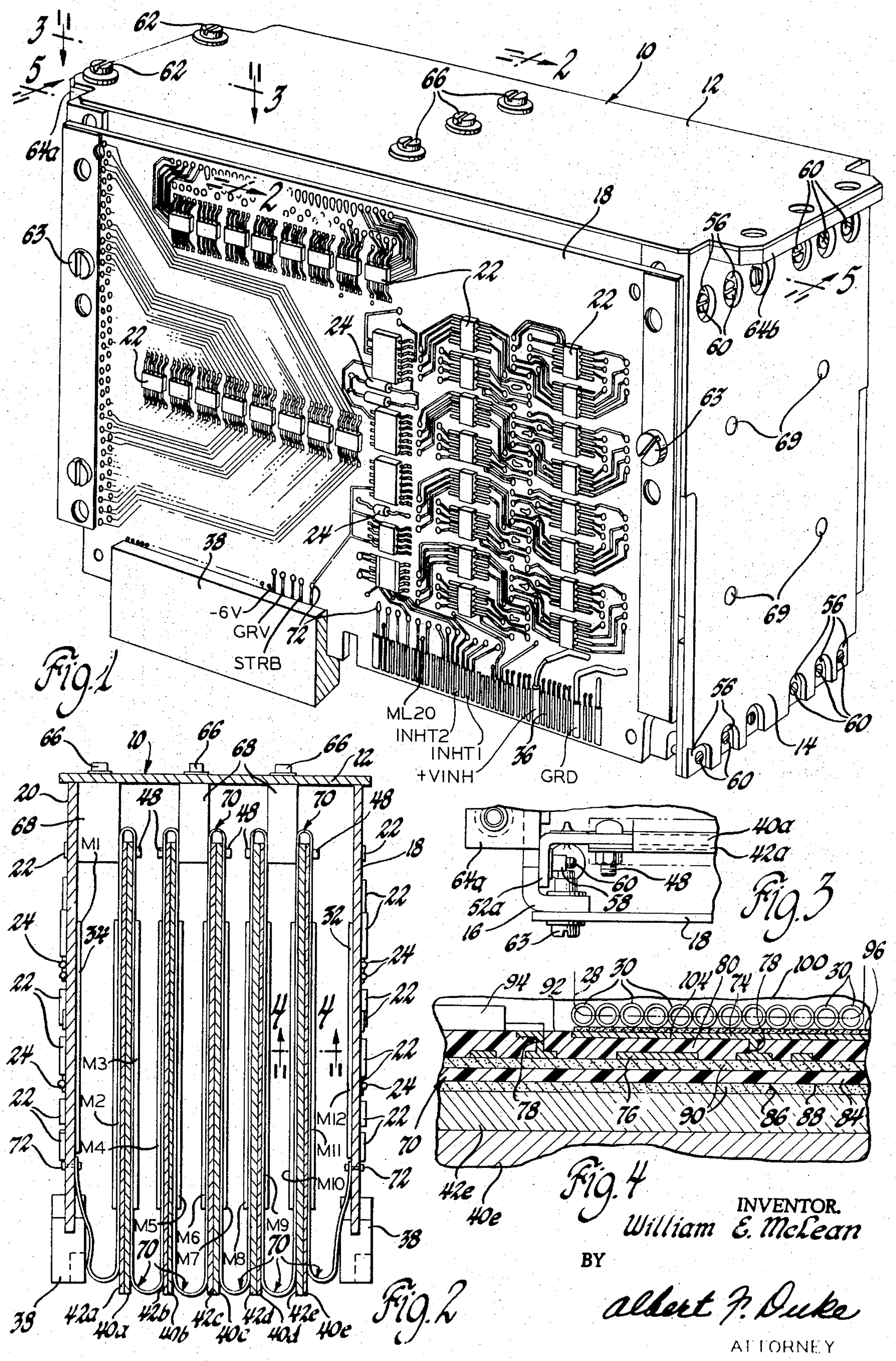
FIG. 1 is an isometric view of the memory assembly of the subject invention completely folded, assembled, and secured to supporting structure.
FIG. 2 is a transverse section of the memory assembly of FIG. 1 along view 2—2 thereof showing the flexible cable and memory mats thereon folded over sets of plates.
FIG. 3 is a partially transverse and partially longitudinal section of a memory assembly of FIG. 1 along lines 3—3 thereof showing the connection of the plate to each other and to the external support structure.
FIG. 4 is a cross section along view 4—4 of FIG. 2 showing in different layers the threaded core array, the means for affixing the memory mat to the top surface of the cable, a heat shield embedded in the cable underneath a set of memory mats, conductors embedded in the cable underneath the heat shield, and a frame attached to the bottom of the cable.

Referring now particularly to FIGS. 1, 2 and 3 there is shown a coincident current memory 10 assembled for connection with a digital computer as for example might be used in an inertial navigation system. The support structure for assembly 10 is comprised of the top 12, end walls 14 and 16, and side walls 18 and 20. On the exterior of the side walls 18 and 20 are mounted diode units 22 and resistors 24 for operating the row and column drive conductors 26 and 28 threaded through the cores 30 and terminated at pads 32 and 34 on the inside of the side walls 18 and 20, the latter termination being shown in FIG. 6. The lower portions of the side walls 18 and 20 have a plurality of contacts 36 for slidable electrical connection with connectors 38 and for subsequent electrical connection to the computer by male connectors (not shown).

Figure 6:
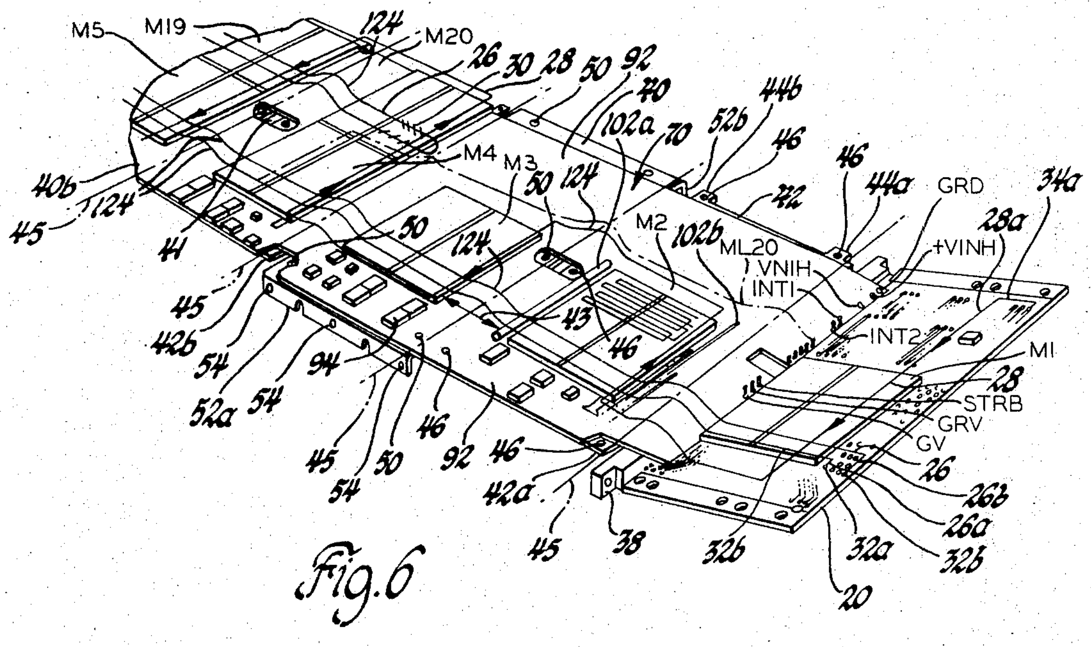
FIG. 6 is a plan view of a portion of the unfolded flexible cable of the subject invention affixed to a set of plates and showing in representative fashion the core arrays having row and column drive conductors therethrough and also showing some of the conductive paths embedded in the cable and their terminations.

As seen in FIG. 2, five sets of plates 40*a* and 42*a*, *b*, *c*, *d* and *e* are located between the side walls 18 and 20. As seen in FIG. 6, plate 42 is flat and has on one end thereof two tabs 44*a* and *b* and has five holes 46 therethrough for attachment to the plate 40 by bolts 48. Plate 40 has a surface encompassing the perimeter of plate 42 when folded theretogether and has five holes 50 alignable with holes 46 of plate 42 when folded theretogether. Plate 40 has two flanges 52*a* and *b* each having holes 54 therethrough alignable with holes 56 in edge walls 14 and 16 when assembled therewith. Press fitted into each one of the holes 54 is a threaded sleeve 58 that may be engaged from the exterior of the end walls 14 and 16 by bolts 60. In this manner bolts 48 draw and support plate 42 against plate 40 in conductive heat transfer relationship and bolts 60 draw and support flanges 52*a* and *b* of plate 40 having plate 42 mounted thereon against edge walls 14 and 16 in conductive heat transfer relationship. Additional rigidity is given to the structure thus packaged by means of cover 12 mounted by bolts 62 threaded into flanges 64*a* and *b* of edge walls 14 and 16 and also by bolts 66 screwed into three spacer blocks 68 located between alternate sets of plates 40 and 42 and attached thereto by bolts 48. While not shown, external structural support is attached to edge walls 14 and 16 through threaded holes 69 as well as by the mating of connectors 38 with receiving male connectors in the external support.

A flexible cable 70, shown folded over plate sets 40 and 42 in FIG. 2 and unfolded in FIGS. 4, 6 and 7, is physically and electrically connected at the ends thereof to side walls 18 and 20 by a plurality of terminal studs 72 that also provide electrical paths between conductors embedded in cable 70 and edge mounted contacts 36. When fully unfolded, the flexible cable has a length in excess of the added widths of each of the core plates 40 and 42 and spaces 41 therebetween when unfolded and a width slightly less than the length of a plate 40 or 42.

As better seen in FIG. 4, the thickness of flexible cable 70 comprises top and bottom conductive layers 74 and 76 sandwiching an insulative layer 80 and having plated through-holes 78 for electrical connection therebetween. Another insulative layer 84 is affixed to the bottom of conductive layer 76 by a suitable adhesive cement 90. Plates 40*e* and 42*e* have the top surfaces 86 thereof affixed to the bottom surface 88 of cable 70 also by cement 90. As better seen in conjunction with FIG. 5, located on top surface 92 of cable 70 between the bottom of a set of mats and the edges of plates 40*b* or 42*b* are electronic units 94 electrically connected to conductive paths in layer 74 and operative as described below. Also affixed to top surface 92 over a plate 40 or 42 first by a double-sided sticky tape 96 and subsequently by a potting compound 100 are either one or two memory mats M2 through M19. For example as seen in FIG. 6, mat M2 is located over plate 42*a*; mat M3 over plate 40*a*; mats M4 and M20 over plate 42*b*; and mats M5 and M19 over plate 40*b*. However, potting compound 100 is prevented from flowing into the spaces 43 between sets of mats by potted beads or "dams" 102*a* and *b* bounding the sides of mat sets so that the continuous drive conductors 26 and 28 therebetween have strain loops 124 that are free to flex with the cable in spaces 43 when being folded along line 45.

Each memory mat is comprised of a plurality of cores 30 capable of being electrically driven to one of two bistable magnetic remnant conditions. The number of cores per mat corresponds to the number of words to be stored in the memory and the number of mats comprising the array corresponds to the number of bits in each word. Thus, with a computer having a capacity of 8,192 words, each of 20 bit length, and with two memory mats per frame, as many as 10 frames might be needed, here translated into five sets of plates 40 and 42*a, b, c, d* and *e*. However, to facilitate terminating the row and column drive conductors 26 and 28 passing through the first and last mats of the array to the side walls 18 and 20, these first and last mats are not mounted on cable 70 but rather on the inner surfaces of the side walls 18 and 20 as for example as shown in FIG. 6. As also shown schematically in FIG. 6, a given row conductor 26 makes two passes through each array and therefore is terminated at the same side wall 18 or 20. Thus, a row conductor 26 has its starting end 26*a* terminated at pad 32*a* and its finishing end 26*b* terminated at pad 32*b*, such pads also being connected by plated holes to the exterior of side wall 20 for connection with diode units 22. In this manner all of the odd numbered rows are terminated on side wall 20 and the even numbered rows are terminated onside wall 18 carrying diode units similar to those shown on side wall 18. The column conductors 28, since they do not make two passes through each mat, have one end terminated on side wall 20 and the other on the side wall 18.

Electronic units, to effect the sense and inhibit operations of their respective mats, are mounted on the cable 70 between the bottom of a set of mats and the edges of the plates 40 or 42. With reference again to FIG. 7, it is seen that the various electronic units U17 through U32 and resistors R17 through R28 are affixed to the top surface 92 of flexible cable 70 between the edge of plates 40 and 42 and the edge of mats M4 and M5. Located on the bottom of plate 40 in the vicinity of flange 52*a* are resistors R29 through R32 in proximity to the processing electronics. These are connected to cable 70 through appropriate openings in plate 40 as are capacitors C5 through C8 located on the bottom of the plate adjacent the opposite flange 52*b*. Of these components, electronic units U17, U18 and U20, and resistor R19 and R20 are unique to the accessing of mat M5; units U21, U22 and U24 and resistors R18, R21 and R22 are unique to the accessing of M19; electronic units U25, U27 and U28, and resistors R25, R26 and R28 are unique to the accessing of mat M4; and electronic units U29, U31 and U32 and resistors R23, R24 and R27 are unique to the operation of mat M20. The remaining electronic units, namely U19, U23 and U30 are shared by two or more mats. These units and components are connected in two groups of conductive paths in cable 70.

The first group is comprised of paths unique to each different mat because they carry signals that require a separate conductor for each mat, and the second is comprised of those paths that are common to all mats. More specifically, the first group includes paths used to command that a particular mat be inhibited during write operations or to communicate whether or not a core in the mat array has been switched during read operations. And, since the read and write accesses do not occur simultaneously, the same access path may be used for both read and write operations. Such access path or memory line is shown generally in FIG. 6 and in greater detail in FIG. 7 as ML20 for mat M20 along with access paths ML4, ML5 and ML19 respectively for mats M4, M5 and M19 and memory lines ML6, ML7, ML17 and ML18 for mats not shown. This first group of conductive paths, when viewed down on top surface 92 of cable 70, traverse the cable initially longitudinally in the second layer 76 from a respective terminal 72 connecting the edge of cable 70 to a side wall 18 or 20. These paths emerge in proximity to the respective mats at various points 78 to the first layer 74 and then submerge again to the second layer 76 where they fan out to the appropriate processing electronics associated with the particular memory mat.

The second group of conductive paths in cable 70 are the power and logic busses and needed to operate the cable mounted sense and inhibit electronics. This group includes a power ground GRD, a positive inhibit voltage +VINH, a negative inhibit voltage −VINA, first and second inhibit timing signals INHT1 and INHT2, −6 volts, +5 volt and +12 volt supplies, a strobe signal STRB, and a signal ground GRD. This second group of paths also traverses the cable initially longitudinally from a respective terminal 72 connecting the edge of the cable to a side wall 18 or 20 and are tapped in proximity to the various mats to emerge thereafter, traverse portions of the width of the cable, subsequently submerge again, and finally fan out to the appropriate processing electronics.

To maximize the combined density of both the mats and electronic units, a given conductor is routed to emerge from the lower layer to the top layer, to traverse certain other conductors in the lower layer and then submerge again to the lower layer in a meandering fashion until finally connected to the points in the circuit shown in FIG. 8. While not shown in complete detail, signals of both groups emerge and submerge in meandering fashion in the area of the electronics to effect the circuit shown in FIG. 8 and described below. The circuit paths for all the signals leading up to the electronic units are shown either in dotted fashion to represent those conductors in the second lower layer 76 of the flexible cable or in solid fashion to represent those conductors in the top layer 74. By way of example, memory access line ML20, 5 volt supply, +5V, and inhibit time one signal INHT1 are shown in FIG. 7 as first running longitudinally from the edge of the cable in the second layer 76 under mat M20 emerging to the top layer 74 in the vicinity of the edge of mat M20. The paths then run substantially parallel to the side of mat M20, to traverse a portion of the width of the cable and then submerge again to the lower layer, there fanning longitudinally to emerge again near U23 and U26 in the case of ML20; near resistors R20, R23, and R24 and current switches U29*a* and U29*b* in the case of the +5 volt supply; and near NAND gate U26 in the case of inhibit time one signal INHT1.

Another feature of cable 70 shown by FIG. 7 is that the top layer 74 includes a substantially rectangular shield portion 104 encompassing the perimeter of the core arrays comprising mats M4 and M20. These shields are connected at points 78 to a ground conductor GRD in order to isolate the conductor buses and memory access lines passing underneath the mats from the shuttle and other noises generated by the selection currents.

The upper conductive layer 74 of cable 70 also includes pads for terminating the ends of the sense and inhibit lines. Thus, with reference to FIGS. 5 and 7, pads 20SG and 20SR are available for terminating beginning and ending portions of sense line SL20. Similarly, pads 20IG, and 20IR and 20IC are available for terminating respectively the two free ends of inhibit line IR20 and also the two common ends.

Electronic units U20, U24, U25 and U29 are current switches used to control the application of drive current in the inhibit lines during writing operation. As described in my copending application Ser. No. 713,638 entitled "Method and Apparatus for Driving Memory Core Selection Lines," filed Mar. 18, 1968 and now U.S. Pat. No. 3,544,978, and assigned to the assignee of the present invention, these switches comprise a PNP source stage which provides sufficient base drive to a following NPN output stage to allow the NPN stage to conduct sufficient current to the memory to permit precise operation thereof while the potentials on the emitter and collector of the NPN vary. The current switches of units U20, U24, U25 and U29 are in turn activated by the outputs of NAND gates contained in electronic units U19, U26 and U30, four NAND gates per unit. The inputs to these NAND gates are the inhibit drive commands applied on memory access lines ML4, ML5, ML19 and ML20 during writing operations.

Electronic units U18, U22, U27, and U31 each contain a pair of operational amplifiers, one pair per memory mat, to sense the outputs of the mat during reading operations. However, to prevent core shuttle noises on the sense lines from causing an output from a respective sense amplifier, the sense lines are connected to the amplifiers through termination or threshold units U17, U21, U28 and U32 that contain resistive circuits suitably biased.

OPERATION

Assuming that one core in each mat receives coincident drive currents, as for instance described in the above-cited copending application Ser. No. 713,638, the operation of the sense and inhibit electronics utilizing the signals and power supplies in the layers of cable 70 will now be described. With reference to the physical structure of FIG. 7 and the electrical representation thereof in FIG. 8, the switching of a core in mat M20 from one remnant state to another, as caused by the coincidence of row column drive currents, induces a voltage on sense line SL20 causing difference in potential between the sense line ends at pads 20SG and 20SR. This difference is communicated to sense line termination unit U32 that blocks differences below a predetermined threshold level from activating sense amplifiers A1 and A2 in electronic unit U31. The inputs to operational amplifiers A1 and A2 are so poled that either a positive input to operational amplifier A1 or negative input to operational amplifier A2 exceeding the requisite threshold produces output to NAND gate in unit U23, the input to NAND gate U23 being augmented by the −6 volts connected to the output of the operational amplifiers across resistor R27. In the present embodiment, a gated reference voltage GRV of about 4 volts is applied across resistors R1 and R2 of U32 to one set of inputs to operational amplifiers A1 and A2 and U31 providing thereat a standoff voltage of about 16 millivolts. Therefore, positive voltage excursions on the sense windings must produce a voltage greater than 16 millivolts across resistors R3 and R5 connected respectively to sense line pads 20SG and 20SR and also to the positive and negative inputs of operational amplifier A1. Similarly, negative excursions of the induced sense voltage must also exceed 16 millivolts when applied to the positive input of operational amplifier A2 across R6 and to the negative input of operational amplifier A2 across R4. It should also be noted that the inputs from pads 20SG and 20SR to threshold circuits U32 are isolated from ground respectively across resistors R7 and R8 each in series with resistor R9.

An output is gated from NAND gate U23 to memory access line 20 ML20 at an instant in the read cycle where the cores being switched generate a maximum voltage. This timing is effected by the presence at another input of NAND gate U23 of a strobe signal STRB generated by electronic units on side wall 20 and transmitted initially through the lower layer of the flexible cable.

Writing operations are effected similarly to reading operations by the coincidence of row and column drive currents at selected cores to render each core in a state from it which can either be switched during reading operations or not. If the effect of such coincidence is to switch the core to a state from which it can be switched back again during reading, a "ONE" thereby is said to be written into the core. If the effect of one of the row or column drive currents at the selected core is "inhibited," usually by a simultaneous current through the core having a sense opposite to that of one of the selection currents, a ZERO is said to be written into the core. A separate inhibit drive conductor may therefore be threaded through all the cores of a given mat. However, because of the number of the cores so threaded greatly exceeds the number of cores threaded by a selection conductor, it is necessary in order to use the same power supplies to use two inhibit conductors and activate either one or the other depending on the mat location (i.e., address) of the core being accessed. Thus, as seen in FIGS. 5, 7 and 8, the inhibit line IL20 for mat 20 is comprised of two halves, one end of each half being terminated to pads 20IG and 20IR, respectively, and the other end of each half being commonly connected at pad 20IC. Also, terminated to pads 20IG and 20IR respectively are current switches U29$a$ and U29$b$, the PNP driver stages of which are biased from the +5 volt supply across resistors R23 and R24 respectively. The conductivity of current switches U29$a$ and U29$b$ are controlled by NAND gates 26$a$ and 26$b$ respectively, one input of each being the command appearing on memory access line ML20 when it is desired to write a zero into mat 20 and another input being either inhibit time 1 signal INHT1 or an inhibit time 2 signals INHT2 depending on which half of inhibit line IL20 is to be driven. Other mats not so commanded by a signal on their respective memory access line will have their selected cores switched to a state permitting a readout therefrom.

A current switch U29$a$ or U29$b$ is turned on when a respective NAND gate U26$a$ or U26$b$ produces a low output upon the coincidence of an inhibit command on memory access line ML20 and inhibit time signal INHT1. To assure that the current switch will turn on promptly upon such coincidence, the collectors of the NPN output stages are maintained at a −1 volt potential through connection to the cathode of diode D1 which continually conducts from ground DRG to the −6 volt supply across resistor 24 mounted on side wall 18. The −1 volt potential on the collector of the NPN output transistor maintains the collector of the PNP driving stage so that the stage is in its active regions promptly upon turn on. Drive current will then flow from ground, diode D1, the collector to emitter junction of the NPN output stage of current switch U29$a$, end pad 20IG, inhibit line IL20, common pad 20IC, resistor R29 and the negative side of the inhibit supply −VINH. When either the ML20 command or the inhibit signal INHT1 rises to produce a high output from NAND gate U26$a$, current switch U29 is turned off. To protect current switch U29 from the effects of the back EMF which would otherwise be induced in the inhibit line IL20 to oppose a change of current flow therethrough, diode D2 is connected across the line to allow the energy stored therein to discharge.

The memory assembly heretofore described may be opened or unfolded merely by removing bolt 62 to disengage top 12 from end walls 14 and 16, removing bolt 63 to release side walls 18 and 20 from end walls 14 and 16, then removing bolts 60 from side walls 14 and 16 to release plates 42$a$, $b$, $c$, and $d$, and finally removing bolts 48 to release plates 40 from plates 42. The flexible cable with the memory mats and the electronics mounted on the top surface thereof and the plates mounted on the bottom surface thereof under respective sets of mats may then be unfolded at spaces 41 and 43 as shown in FIGS. 6 and 7. Since no electrical disconnections are required in such folding or unfolding, the entire memory assembly including memory mats, electronics, and the conductive paths in the cables may be tested as a system either folded or unfolded by applying signals through connector 38. Should a fault be encountered, it may be diagnosed and located by applying appropriate voltages to and monitoring responses at respective terminals 72, thereby allowing mat-by-mat testing and repair. After such fault is found and repaired the assembly may be folded or closed again by tightening the bolts in an order inverse of that which they were removed for unfolding. It is specifically noted that none of the memory access lines are disconnected and subsequently reconnected in the unfolding and folding operations. It is also noted that since the sense signals are detected and amplified in proximity to the respective mats, signals carried by the memory access have low noise ratio, an advantage further enhanced by the shields between the mats and the conductive layers of the cable. It is also noted that any mechanical stresses on the selection lines between mats during the unfolding and folding operations is minimized since the mats are secured to the cable and since the selection lines have strain loops free to flex in the spaces between the mats. Therefore, the cable and not the selection lines bears substantially all the tensile and supporting stresses when the assembly is fully unfolded and laid flat.

Having described one embodiment of the present invention, it is understood that the specific terms and examples are employed in a descriptive sense only and not for the purpose of limitation. Other embodiments of the invention, modifications thereof, and alternatives thereto may be used. For example, the separate inhibit conductor may be eliminated from each mat and its function performed by driving currents through the sense line during writing operations in an embodiment substantially the same as that described except for additional connections between the sense line and the inhibit electronics. I therefore aim in the appended claims to cover such modifications and changes as fall within the true spirit and scope of my invention.

What is claimed is:

1. In a magnetic memory system, a memory assembly comprising:

a. a memory array comprised of a plurality of memory mats, each mat comprised of a plurality of bi-remnant magnetic cores positioned to define rows and columns, conductive sensing and inhibiting means threading all the cores of the mat, and a plurality of row and column conductors each threading all the cores of a different respective row and column of cores in the mat, the row and column conductors threading corresponding row and columns of different mats and being continuous, one of said row and column conductors thereby connecting said mats in series and defining spaces between the widths of contiguous mats, whereby said array of mats is foldable at said spaces, and b. a flexible cable having a top surface affixed to said mats and having a plurality of conductive memory access paths each electrically connected with a different said conductive sensing and inhibiting means and otherwise insulated from said mats, whereby said cable having said array of mats affixed thereto may be folded at said spaces with said sensing means connected to said conductive paths.

2. In a magnetic memory system, a memory assembly comprising:

a. a memory array comprised of a plurality of memory mats, each mat comprised of a plurality of bi-remnant magnetic cores positioned to define rows and columns, a sense line threading all the cores of the mat, and a plurality of row and column conductors each threading all the cores of a different respective row and column of cores in the mat, the row and column conductors threading corresponding row and columns of different mats and being continuous, one of said row and column conductors thereby connecting said mats in series and defining spaces between the widths of contiguous mats, whereby said array of mats is foldable at said spaces, b. a flexible cable having a top surface affixed to said mats and having a plurality of conductive memory access paths each electrically connected with a different sense line and otherwise insulated from said mats, whereby said cable having said array of mats affixed thereto may be folded at said spaces with said sense lines electrically connected to said conductive paths, and c. a plurality of electronic units each connected in circuit with a different conductive path and different sense line of a mat and affixed to said top surface in the region of the width of said different mat, whereby said cable and units are foldable at said spaces with said conductive paths connected to said units.

3. In the memory assembly of claim 2, said cable comprising top and bottom conductive layers separated by insulation therebetween each said layer comprising power and logic paths and said plurality of memory access paths, each said path of one layer being electrically connected with a corresponding path in the other layer and the paths in said top layer connected in circuit with said electronic units.

4. In the memory assembly of claim 2 said cable comprising top and bottom conductive layers separated by insulation therebetween, said bottom layer comprising a plurality of memory access paths, each said path connected to a different sense line of a different mat and said top layer comprising a plurality of shield being areas, each said shield under a different mat and the perimeter of said shield corresponding substantially with the perimeter of said mat, whereby said memory access paths are shielded from noises generated in the operations of said cores.

5. In the memory assembly of claim 2 said mats comprising an inhibit line threaded through all the cores of the mat and electrically connected in circuit with said memory access paths.

6. In a magnetic memory system, a memory assembly comprising:

a. a memory array comprised of a plurality of memory mats, each mat comprised of a plurality of bi-remnant magnetic cores positioned to define rows and columns, a sense line threading all the cores of the mat, and a plurality of row and column conductors each threading all the cores of a different respective row and column of cores in the mat, the row and column conductors threading corresponding row and columns of different mats and being continuous, one of said row and column conductors thereby connecting said mats in series and defining a space between the width of contiguous mats, whereby said array of mats is foldable at said spaces, b. a flexible cable having a top surface affixed to said mat and having a plurality of conductive memory access paths each electrically connected to a different sense line and otherwise insulated from said mat, whereby said cable having said array of mats affixed thereto may be folded at said spaces with said sense lines electrically connected to said conductive paths, c. a plurality of electronic units each connected in circuit with a different memory access path and different sense line of a mat and affixed to said top surface in the region of the width of said different mat, whereby said cable and units are foldable at said spaces with said conductive paths electrically connected to said units, and d. a plurality of thermally conductive plates, each said plate affixed to the bottom surface of said cable under a different said mat and defining spaces between said plate under said spaces between said mat, said plates comprising contiguous sets of plates whereby said cable having said array of mats affixed to the top surface thereof and said sets of plates affixed to the bottom surface thereof may be folded at said spaces so that bottom surface of one plate of a set contacts the bottom surface of the other plate of said set.

7. In the memory assembly of claim 1, said one of said row and column conductors having loop portions in said spaces and free of said top surface so that said cable bears substantially all the tensile forces associated with folding and unfolding said assembly.

* * * * *